UNITED STATES PATENT OFFICE.

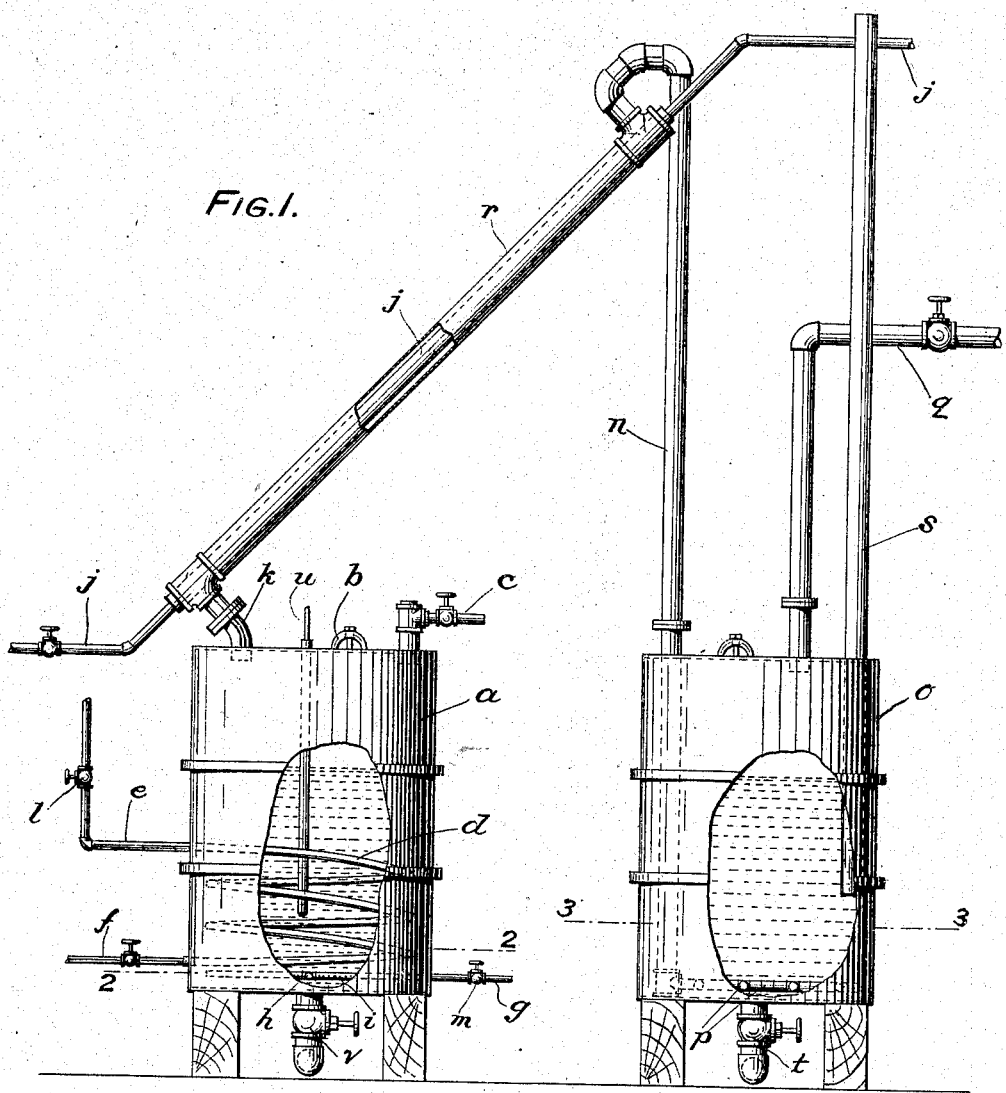

CHARLES M. STINE, OF CHESTER, PENNSYLVANIA, ASSIGNOR TO THE E. I. DU PONT DE NEMOURS POWDER COMPANY, OF WILMINGTON, DELAWARE, A CORPORATION OF NEW JERSEY.

METHOD OF OBTAINING PURIFIED AMMONIA-GAS FROM AMMONIA LIQUORS.

No. 929,726.            Specification of Letters Patent.            Patented Aug. 3, 1909.

Application filed April 7, 1908. Serial No. 425,613.

*To all whom it may concern:*

Be it known that I, CHARLES M. STINE, a citizen of the United States, residing at Chester, county of Delaware, and State of Pennsylvania, have invented a new and useful Improvement in Methods of Obtaining Purified Ammonia-Gas from Ammonia Liquors, of which the following is a full, clear, and exact description, reference being had to the accompanying drawings, which form a part of this specification.

The various ammonia salts as nitrate, sulfate, etc. are usually manufactured from a more or less crude ammonia liquor, by neutralizing the ammonia in this liquor with the corresponding acid. This crude ammonia liquor, which is a solution of ammonia gas in water, usually contains a considerable amount of impurities, such as sulfur compounds and various organic substances. If, in the manufacture of ammonia salts, the acid and crude ammonia liquor are directly mixed together in such proportions as to form a neutral salt, the resulting solution of the salt contains the impurities contained in the liquor, and upon evaporation an impure salt is obtained, and in addition to this, in the case of an acid like nitric acid, there is a considerable reduction in yield owing to the reduction of the nitric acid by the sulfur compounds in the ammonia liquor, and also there is danger of ignition of the whole mass caused by the presence of organic compounds. In order to obviate these difficulties, it has been customary to distil off the ammonia gas from the solution and pass the gas into the acid, either directly or through a dephlegmating apparatus and variously constructed scrubbers.

I have discovered an improved process or method for obtaining purified ammonia gas from ammonia liquors. This process consists in forcing a current of air through the ammonia liquor in a still provided with a return condenser. The air mixed with the ammonia gas passes through the return condenser, whereby the volatilized water and organic impurities are returned to the still, and thence into a scrubber containing soda ash and lime, whereby all sulfur compounds are held back; from the scrubber the mixture of air and ammonia gas is passed directly into the acid where it is absorbed with the production of the desired salt. In this process, I preferably start by forcing air through the ammonia liquor at the atmospheric temperature so as to drive off a portion of the ammonia by the current of air alone. I then gradually raise the temperature to or even above the boiling point of water, continually passing the current of air through the liquid. It is necessary to maintain the final high temperature for only a comparatively short time, owing to a large proportion of the ammonia having been already removed from the liquor by the air current.

The advantages of the use of the air current are: 1st. Saving of heat in driving off the ammonia from the solution as the air carries off a large amount of ammonia before heat is applied. 2nd. Equalization of the whole process; the excess of air preventing bumping, frothing and foaming. 3rd. At the end of the process, the current of air quickly sweeps all the ammonia out of the system, saving both time and heat in the operation.

As an example of my process, I have taken a still containing about 450 pounds of ammonia liquor. This ammonia liquor should contain, as is well known, sufficient lime to break up the fixed ammonia. This still is closed, and air under pressure of about 40 pounds is forced into the ammonia liquor at the bottom of the still. I do not wish to limit myself to air forced through the liquor under pressure, as suction, or any other available means for inducing an air current may be used. The still is heated by means of a coil through which steam is passed. Initially, no steam is admitted to the coils, and the ammonia gas is driven off merely by the air under pressure passing through the ammonia liquor. Steam is then admitted to the coils, so as to gradually raise the heat, until ultimately and finally a heat above the boiling point of water is reached. Any other method for heating the ammonia solution may be used, as direct heat or passing live steam directly into the liquor, which may or may not be mixed with the air current.

In the accompanying drawing, I have illustrated an appara͏̆ ͏͏which my pro͏͏ has been and may

*a* is a still b͏
still is provid͏
mission of th͏
*d* is a steam c͏ leading from a source of steam supply and the outlet pipe $f$.

$g$ is a pipe leading from a source of air under pressure, not shown, into the bottom of the still and having, in said still, the branch pipes $h$ provided with horizontal openings $i$.

$u$ is a thermometer in the still $a$ for accurately determining the temperature and $v$ is a draw off cock for said still.

$r$ is the return condenser.

$j$ is the cold water pipe of the return condenser.

$k$ is the pipe leading from the still to the condenser. The pipes $e$ and $g$ are provided with regulating cocks $l$ and $m$ respectively.

$n$ is a pipe leading from the condenser to the scrubber $o$.

This pipe $n$ opens into the perforated pipes $p$ to enable the gas to pass throughout the material in the scrubber.

$q$ is a pipe leading from the scrubber to the tank of nitric acid, not shown, and $s$ is a stand pipe to equalize the pressure in scrubber $o$.

$t$ is the draw off cock for scrubber.

When I use the term "forcing" in the specification and claims, I intend to include both a case where the "forcing" is caused by pressure in or behind the air and suction in front of the air.

Having now fully described my invention, what I claim and desire to protect by Letters Patent is:

1. The method of obtaining purified ammonia gas from ammonia liquors, which consists in forcing a current of air through the liquor, and gradually increasing the temperature of the same to a point at, or above, the boiling point of water.

2. The method of obtaining purified ammonia gas from ammoniacal liquors, which consists in forcing a current of air through the liquor initially at atmospheric temperature and then gradually heating the same.

In testimony of which invention, I have hereunto set my hand, at Gibbstown, on this fourth day of April, 1908.

CHARLES M. STINE.

Witnesses:
H. M. PAULL,
W. C. HOLMES.